United States Patent Office 3,399,221
Patented Aug. 27, 1968

3,399,221
PROCESS FOR PREPARING ALKYL ALUMINUM HALIDES
Giuseppe C. Bertoni and Giorgio Moretti, Ferrara, Italy, assignors to Montecatini Edison S.p.A., Milan, Italy
No Drawing. Filed Nov. 20, 1962, Ser. No. 239,073
Claims priority, application Italy, Nov. 22, 1961, 20,996/61
14 Claims. (Cl. 260—448)

The present invention relates to a new method for preparing alkyl aluminum halides, such as dialkyl aluminum monohalides having the general formula:

$$R_2AlX$$

in which X is a halogen and R is a linear or branched alkyl group.

These metallorganic aluminum compounds are widely employed as components of stereospecific catalysts for the polymerization of olefins.

Various methods for the preparation of these compounds are known. These methods are summarized hereinbelow, together with a brief description of the drawbacks which limit their practical application:

(a) The reaction of an alkyl halide with aluminum powder or chips: This method makes it possible to obtain only alkyl aluminum sesquihalide ($R_3Al_2X_3$) which must be subjected to a partial dehalogenation with sodium in order to obtain the dialkyl aluminum monohalide. In addition, the sodium, which is transformed into NaCl, cannot be recovered;

(b) The reaction of an alkyl halide with an Al-Mg alloy: Dialkyl aluminum monohalide is obtained, but large amounts of magnesium are consumed;

(c) The reaction of aluminum trialkyl with an aluminum trihalide: By varying the ratios between the reactants, all the alkyl aluminum halides can be obtained; however, in order to apply this method, perfectly anhydrous aluminum trihalides must be available. The obtaining of such anhydrous compounds is not easy, due to their high hygroscopicity;

(d) The reaction of aluminum trialkyls with halogens.

We have now discovered a new process for preparing dialkyl aluminum monohalides which does not present the drawbacks encountered with the known processes. In general, this process comprises reacting a halogen with a dialkyl aluminum monohydride.

The monohydride is the intermediate product obtained in the synthesis of aluminum trialkyls from aluminum, an olefin and hydrogen while under pressure when operating with an excess of aluminum and hydrogen.

By operating with an excess of these reactants and charging an olefin such as ethylene in a batchwise manner, instead of the complete reaction:

(1)   $Al+3C_nH_{2n}+3/2H_2 \rightarrow Al(C_nH_{2n+1})_3$ there takes place the partial synthesis:

(2)   $Al+2C_nH_{2n}+3/2H_2 \rightarrow Al(C_nH_{2n+1})_2H$

The dialkyl aluminum monohydride then reacts under low pressures with further olefin and gives aluminum trialkyl according to the equation:

(3)   $Al(C_nH_{2n+1})_2H+C_nH_{2n} \rightarrow Al(C_nH_{2n+1})_3$

We have now found that, if this process for preparing aluminum trialkyls is stopped in the first stage and the monohydride thus formed is treated with halogen, an evolution of gas takes place together with the formation of dialkyl aluminum monohalide in very high yields.

The reaction of halogen with the alkyl aluminum monohydride occurs easily at temperatures not higher than 80° C., preferably at temperatures between 10 and 30° C.; and the reactor must thus usually be cooled in order to remove the heat of the reaction. When using liquid or solid halogen, such as bromine or iodine, it is sufficient to add the halogen to a metallorganic compound kept in vigorous agitation, while removing the gases which are evolved. When using a gaseous halogen, such as chlorine, the halogen can be bubbled through the liquid or placed in contact with the surface of the agitated liquid. The halogen is preferably used in stoichiometric amount with respect to the monohydride; however excess amounts up to 10% can be used.

The reaction can be carried out at pressures between 1 and 20 atm., preferably at atmospheric pressure. When it is operated under pressure, the reactor may be periodically emptied in order to remove the reaction products.

Alkyl aluminum hydrides may be used alone or in solutions of hydrocarbon solvents, such as, e.g., saturated aliphatic or aromatic compounds.

A distinct advantage of the process of the present invention is that it makes possible the use of dialkyl aluminum monohydride instead of the aluminum trialkyls employed in known processes (such as methods (c) and (d) mentioned above), for the synthesis of dialkyl aluminum monohalides. This avoids the usual second stage in the synthesis of aluminum trialkyls (Reaction 3) by using directly the product of the first stage (Reaction 2).

Another important advantage of the process of this invention is that the dialkyl aluminum monohydride can be used directly without subjecting it to any purification process.

It has, in fact, been found that the only other product which is substantially present in the monohydride is the corresponding aluminum trialkyl. The trialkyl is generally present in small proportions which vary with the particular method of preparation. The aluminum trialkyl readily reacts with halogens to produce alkyl halides (method (d) mentioned above). As a consequence, the aluminum trialkyls will also react, producing dialkyl aluminum monohalide.

It is evident, however, that the process of the present invention can be applied to any dialkyl aluminum monohydride regardless of its particular method of preparation.

Particularly suitable dialkyl aluminum monohydrides for the process of the present invention are: $AlH(C_2H_5)_2$,

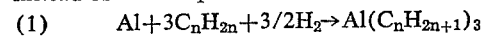$AlH(i—C_4H_9)_2$, $AlH(C_3H_7)_2$, $AlH(i—C_3H_7)_2$

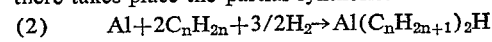$AlH(C_6H_{13})_2$, $AlH(C_4H_9)_2$, $AlH(i—C_6H_{13})_2$

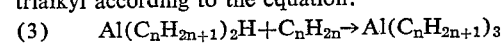$AlH(C_8H_{17})_2$, $AlH(C_{10}H_{21})_2$

The following examples are given to illustrate the present invention without intending in any way to limit its scope.

EXAMPLE 1

$AlH(C_2H_5)_2$ is prepared by the reaction between Al, ethylene and $H_2$ (using an excess of Al and $H_2$) and 100° C. under a pressure of 200 atmospheres. The $AlH(C_2H_5)_2$ thus obtained has an Al content of 28.5%.

71 g. of this $AlH(C_2H_5)_2$ are placed, while operating under anhydrous nitrogen, into a 500 cc. flask provided with a thermometer, agitator, reflux condenser and a pipe for introducing the gases (which pipe is not immersed in the liquid). The reflux condenser is connected with a gasometer for collecting the evolved gases.

8.4 normal liters of anhydrous chlorine (corresponding in gram atoms to the amount of aluminum present in the monohydride) are slowly introduced into the flask while cooling the flask with an oil bath kept at low enough temperatures so as to maintain the flask at about 20° C.

7.6 normal liters of a gas which, by gas chromatographic analysis, is shown to be composed prevailingly of hydrogen with small amounts of ethane, are evolved.

The reaction product is then distilled under vacuum to obtain 86 g. of a clear liquid which, upon analysis, appears to consist of aluminum diethyl monochloride, as shown by the following:

Al found=22.7%; Al theoretical=22.4%

Cl found=29.16%; Cl theoretical=29.41%

By decomposing the product with 2-ethylhexyl alcohol, a gas is developed which, upon gas chromatographic analysis, appears to contain essentially ethane with 2.8% mols of hydrogen and traces of butane.

The yield with respect to the starting organic aluminum compound is 96%.

EXAMPLE 2

Upon operating under the conditions of, and using the reactants of Example 1, 75.5 g. of $AlH(C_2H_5)_2$ are reacted with 9.8 normal liters of chlorine.

By distillation under a high vacuum, 98 g. of a product which, by analysis, appears to be essentially diethylaluminum monochloride: (Al found=21.65%; Cl found= 28.2%) are obtained. The gas developed by decomposition of this product with 2-ethylhexyl alcohol contains 3.5% by mols of hydrogen, and the remaining portion consists of ethane with traces of butane.

The yield, with respect to the starting organic aluminum compound is 98%.

EXAMPLE 3

By operating under the conditions described in Example 1, 81 g. of $AlH(C_2H_5)_2$ having an Al content of 29.2% (obtained by distillation under vacuum in a thin-layer molecular distiller of the monohydride obtained as in Example 1) are reacted with 10.33 normal liters of chlorine (which is an excess of 5% with respect to the aluminum present in the metallorganic compound). During the reaction 8.9 normal liters of a gas, essentially composed of hydrogen with small amounts of ethane, are evolved.

Upon distillation under a high vacuum, 103 g. of a product composed essentially of diethyl Al monochloride are then recovered. The analysis of the product showed the following: Al found=20.9%; Cl found=27.82%.

The gas evolved by decomposition with 2-ethylhexyl alcohol contains 2.2% mols of hydrogen, the remaining portion thereof consisting of ethane with small amounts of butane.

The product yield, with respect to the starting organic aluminum compound, is 91%.

EXAMPLE 4

By operating with the procedures and the reactants described in Example 1, 84 g. of $AlH(C_2H_5)_2$ dissolved in 145 cc. of anhydrous heptane are reacted with 10.5 normal liters of chlorine. At the end of the reaction, the mixture is heated to 100° C. in order to remove completely the reaction gases dissolved in the solution. A total of about 10.5 normal liters of gas, which appears to consist essentially of hydrogen with very small amounts of ethane, are collected.

Heptane is then eliminated by evaporation under high vacuum, thereby collecting 100.2 g. of product which, by analysis, is shown to be $AlCl(C_2H_5)_2$ (Al found= 21.2%; Cl found=28.4%). Upon decomposition with 2-ethylhexyl alchohol, a gas is evolved containing only 1% by mols of hydrogen, while the remaining portion contains ethane with traces of butane. The yield with respect to the starting organic aluminum compound is 89%.

EXAMPLE 5

Into a 3-liter autoclave provided with a paddle agitator, a pressure gauge, valves for introducing the gases and the reactants and for discharging the product, a thermometer sheath and an oil-circulation jacket, 369 g. of $AlH(C_2H_5)_2$, similar to that described in Example 1, are charged.

While cooling vigorously so as to maintain a temperature of about 50–60° C. in the autoclave, 170 g. of chlorine are introduced under pressure. The pressure in the autoclave due to the evolution of gas rises to 10 atmospheres. The gases are released, and chlorine is again introduced up to a maximum pressure of 15 atmospheres.

When the pressure remains constant, the gases are again released, and the autoclave is opened. The gas collected in the two operations consists essentially of hydrogen with small amounts of ethane.

From the product discharged from the autoclave and distilled under a high vacuum, 480 g. of a clear liquid are obtained. The analytical results are: Al found= 20.9%; Cl found=32.55%. The decomposition gas consists of ethane with small traces of butane and hydrogen.

The product consists prevailingly of $(C_2H_5)_2AlCl$ and small amounts of $C_2H_5AlCl_2$.

The product yield with respect to the starting organic aluminum compound is 92%.

EXAMPLE 6

A reaction is carried out in an autoclave employing an excess of $H_2$, an excess of Al and suitable amounts of ethylene while operating at 100° C. under a pressure of 200 atm. The product obtained is then distilled under high vacuum using the technique described in Example 3.

57 g. of this product are placed in a 500 cc. flask provided with an agitator, a thermometer and a reflux condenser connected with a gasometer and a dropping funnel. This product has an Al content of 29.35%, and upon decomposition with 2-ethylhexyl alcohol, there is evolved a gas which by gas chromatographic analysis appears to be composed of 33% hydrogen, with the remaining proportion being ethane and small amounts of butane. The product is therefore $Al(C_2H_5)_2H$.

While suitably cooling the reaction flask, 52.5 g. of bromine (corresponding to about a 5% gram-atom excess with respect to the organic Al compound present in the monohydride) are added dropwise to the hydride. The flask is then heated to 60° C. for 90 minutes. The reaction develops about 7 normal liters of a gas essentially composed of $H_2$, with the remainder being ethane.

Upon distillation under a high vacuum, 102 g. of a product which has the following analytical characteristics are obtained:

Al=15.6%

Br=48.2%

By decomposition of the product with 2-ethylhexyl alcohol, there is evolved 253.1 normal cc./g. of a gas which, upon gas chromatographic analysis is shown to contain 92.5% ethane and small amounts of hydrogen and butane.

The product obtained is essentially composed of $Et_2AlBr$ (theoretical Al=16.36%; theoretical Br= 48.43%).

EXAMPLE 7

60.5 g. of $Et_2AlH$, having the characteristics of the product described in Example 6, are placed in an apparatus similar to that described in Example 6, but wherein the dropping funnel has been replaced with a suitable iodine dosage device. By operating with the reaction procedures described in Example 6, about 88 g. of iodine are slowly added. During the reaction about 7 normal liters of a gas essentially made up of $H_2$ are evolved.

By distillation under a high vacuum, 134 g. of a product which shows the following analytical characteristics are obtained:

Al=13.15%

I=55.3%

The decomposition of this product with 2-ethylhexyl alcohol results in the evolution of 212 normal cc./g. of a gas composed essentially of ethane and smaller amounts of butane and hydrogen.

The product is therefore essentially composed of Et$_2$AlI (theoretical Al=12.7%; theoretical iodine= 59.8%).

EXAMPLE 8

60.5 g. of a product produced in an autoclave from H$_2$, Al and isobutene while operating at 120° C. under a pressure of 200 atmospheres and employing an excess of H$_2$ and Al, are introduced into the apparatus described in Example 1.

This product has an Al content of 17.9% and, upon decomposition with 2-ethylhexyl alcohol, it evolves a gas which by gas chromatographic analysis appears to contain 33% of H$_2$, with the remaining portion being isobutane and small amounts of butane. The product is therefore aluminum diisobutyl monohydride.

While operating with the reaction procedures described in Example 1, 4.7 normal liters of anhydrous Cl (corresponding in gram atoms to about a 5% excess with respect to the amount of Al present in the metallorganic compound) are introduced. The flask is finally heated to 80° C. for 60 minutes.

During the reaction, about 5.4 normal liters of a gas prevailingly made up of H$_2$ with small amounts of isobutane and smaller amounts of ethane and n-butane are evolved.

By distillation under a high vacuum, 65 g. of a product having the following analytical characteristics are obtained:

Al=15%
Cl=21.8%

This product upon decomposition with 2-ethylhexyl alcohol develops 228 normal cc./g. of a gas. This gas is subjected to gas chromatographic analysis and shows the following composition:

94% isobutane,
3% n-butane,
Small amounts of other hydrocarbons and of hydrogen.

The product obtained is therefore essentially aluminum diisobutyl monochloride (theoretical Al=15.2%; theoretical Cl=20.1%).

Many variations and modifications can, of course, be practiced without departing from the scope and spirit of the present invention.

Having thus described the invention, what we desire to claim and secure by Letters Patent is:

1. A process for preparing dialkyl aluminum monohalides, which comprises reacting, under anhydrous conditions, a dialkyl aluminum monohydride with from about the stoichiometric amount to about 10% in excess of the stoichiometric amount of a halogen.

2. The process of claim 1 wherein said reaction is carried out at temperatures between 0° and 80° C.

3. The process of claim 1 wherein said reaction is carried out under about atmospheric pressure.

4. The process of claim 1 wherein said reaction is carried out under autogenous pressure.

5. The process of claim 1 wherein said reaction is carried out under an anhydrous nitrogen atmosphere.

6. The process of claim 1 wherein said dialkyl aluminum monohydride is employed in the pure state.

7. Process of claim 1 wherein said dialkyl aluminum monohydride is employed in the form of a solution in a hydrocarbon solvent.

8. The process of claim 1 wherein said dialkyl aluminum monohydride contains a small proportion of the corresponding aluminum trialkyl.

9. A process for preparing diethyl aluminum monochloride which comprises reacting, under anhydrous conditions, diethyl aluminum monohydride with from about the stoichiometric amount to about 10% in excess of the stoichiometric amount of chlorine at room temperature.

10. The process of claim 1 wherein chlorine is the halogen.

11. The process of claim 1 wherein iodine is the halogen.

12. The process of claim 1 wherein bromine is the halogen.

13. The process of claim 1 wherein aluminum diethyl monohydride is the monohydride.

14. The process of claim 1 wherein aluminum diisobutyl monohydride is the monohydride.

References Cited

UNITED STATES PATENTS

| | | | |
|---|---|---|---|
| 2,270,292 | 1/1942 | Grosse | 260—448 |
| 2,388,428 | 11/1945 | Mavity | 260—448 |
| 3,074,986 | 1/1963 | Koster et al. | 260—448 |

OTHER REFERENCES

Zeiss, H.: Organometallic Chemistry, 1960, Reinhold Pub. Corp., New York, page 206.

Zakharkin et al.: Bull. Acad. Sci., U.S.S.R. (1959), pages 151–153.

TOBIAS E. LEVOW, Primary Examiner.

H. M. S. SNEED, Assistant Examiner.